United States Patent [19]

Cornelius et al.

[11] 3,923,455

[45] Dec. 2, 1975

[54] PROCESS OF DYEING AND PRINTING SYNTHETIC HYDROPHOBIC MATERIALS WITH WATER-INSOLUBLE MONOAZO DYES

[75] Inventors: Dieter Cornelius, Darmstadt-Arheilgen; Hanswilli von Brachel, Leopoldshohe, both of Germany

[73] Assignee: Cassella Farbwerke Mainkur Aktiengesellschaft, Germany

[22] Filed: July 31, 1973

[21] Appl. No.: 384,273

Related U.S. Application Data

[63] Continuation of Ser. No. 92,844, Nov. 25, 1970, abandoned.

[30] Foreign Application Priority Data

Apr. 24, 1970  Germany............................ 2020030

[52] U.S. Cl............................. 8/41 B; 8/41 C; 8/50
[51] Int. Cl.²............................................. D06P 1/04
[58] Field of Search........ 8/41 C, 41 D, 41 A, 41 B, 8/50

[56]  References Cited
UNITED STATES PATENTS

| | | | |
|---|---|---|---|
| 3,250,763 | 5/1966 | Gies et al. ........................ | 8/41 C X |
| 3,627,752 | 12/1971 | Cornelius et al .................... | 260/205 |
| 3,632,569 | 1/1972 | Artz et al. ......................... | 8/41 C X |
| 3,772,267 | 11/1973 | Cornelius et al. ................. | 8/41 C X |

FOREIGN PATENTS OR APPLICATIONS

| | | | |
|---|---|---|---|
| 1,125,683 | 8/1968 | United Kingdom............. | 260/207.1 |
| 1,511,933 | 12/1967 | France ............................ | 260/207.1 |
| 1,809,921 | 6/1970 | Germany ........................ | 260/207.1 |

*Primary Examiner*—Benjamin R. Padgett
*Assistant Examiner*—E. A. Miller
*Attorney, Agent, or Firm*—Connolly and Hutz

[57]  ABSTRACT

Water-insoluble monoazo dyes of the formula

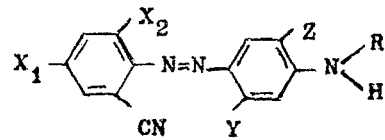

and process of producing and using the same for dyeing and printing of synthetic hydrophobic materials.

4 Claims, No Drawings

PROCESS OF DYEING AND PRINTING SYNTHETIC HYDROPHOBIC MATERIALS WITH WATER-INSOLUBLE MONOAZO DYES

CROSS REFERENCE TO RELATED APPLICATION

This application is a continuation of application Ser. No. 92,844 filed Nov. 25, 1970 and now abandoned.

The present invention relates to valuable new water-insoluble monoazo dyes having the formula

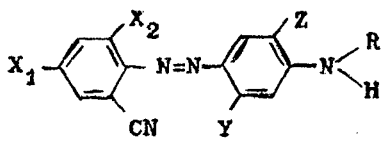

wherein $X_1$ is nitro, cyano or alkylsulfonyl or dialkylaminosulfonyl having from 1 to 4 carbon atoms in each alkyl moiety; $X_2$ is alkylsulfonyl having 1 to 4 carbon atoms; Y is hydrogen, alkyl or alkoxy having 1 to 4 carbon atoms, alkanoylamino having 2 to 5 carbon atoms, —$NHCOCH_2R_1$ wherein $R_1$ is cyano, methoxy, hydroxy, chloro or acetoxy, —$NHCONHR_2$ wherein $R_2$ is hydrogen or alkyl having 1 to 4 carbon atoms, —$NHCOOR_3$ wherein $R_3$ is alkyl having 1 to 4 carbon atoms or —$NHCOC_6H_5$; Z is hydrogen, alkyl or alkoxy having 1 to 4 carbon atoms or —$OCH_2CH_2R_1$ wherein $R_1$ is as aforesaid; and R is alkyl having 1 to 4 carbon atoms or mono-substituted alkyl wherein said alkyl moiety has from 1 to 4 carbon atoms and said substituent is cyano, acetoxy, hydroxy, methoxycarbonyl, ethoxycarbonyl, phenyl, methylsulfonyl, ethylsulfonyl or nitro.

The dyes of this invention are prepared in the usual manner by coupling diazotized amines of the general formula

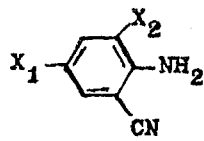

with tertiary amines of the general formula

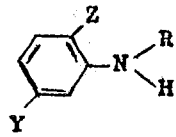

wherein $X_1$, $X_2$, Y, Z and R are defined above.

The new azo dyes are also obtained by exchanging, according to the teachings of French Pat. No. 1,524,647, in a nucleophilic reaction cyano for the halogen atoms of monoazo dyes having the general formula

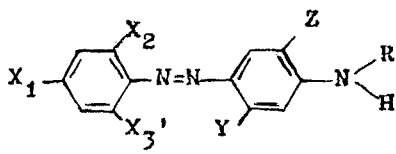

wherein $X_1$, $X_2$, Y, Z and R are as defined above, and $X_3'$ means halogen, preferably chloro or bromo.

The azo dyes of the present invention are also obtained by exchanging, according to the teachings of German Offenlegungsschrift No. 1,809,921 in a nucleophilic reaction alkylsulfonyl for the halogen atoms or nitro groups of monoazo dyes having the general formula

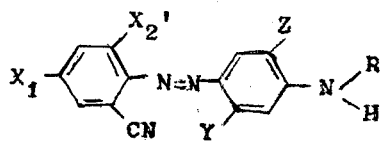

wherein $X_1$, Y, Z and R are as defined above and $X_2'$ means halogen, preferably chloro or bromo, or a nitro group.

As contrasted with those dyes bearing in the coupling component a tertiary amino group, the comparable dyes of the present invention having a secondary amino group distinguish themselves by a higher tinctorial power.

Typical diazo components useful in the preparation of the dyestuffs of the present invention include: 2-cyano-4-nitro-6-alkylsulfonyl-anilines, 2,4-dicyano-6-alkylsulfonyl-anilines, 2-cyano-4,6-dialkylsulfonyl-anilines, 2-cyano-4-dialkylamino-6-alkylsulfonyl-anilines.

Typical coupling components for the use in the preparation of the instant dyes containing a secondary amino group include: N-alkylanilines and their derivatives which are substituted in the m-position of the benzene ring such as N-alkyl-m-toluidines, N-alkyl-m-methoxyanilines or N-alkyl-m-acetylamino-anilines; N-alkyl-2-methyl-5-methoxyanilines; N-alkyl-2-methyl-5-ethoxyanilines; N-alkyl-2-methoxy-5-acetylamino-anilines; N-alkyl-2-ethoxy-5-acetyl-amino-anilines; N-alkyl-2-methoxy-5-propionylamino-anilines; N-alkyl-2-ethoxy-5-propionylamino-anilines.

Alkyl groups in the meaning of the present invention are preferably methyl, ethyl, butyl, i.e. those having 1–4 carbon atoms. Particularly valuable dyestuffs are obtained by using coupling components, the alkyl group of which represents a β-substituted ethyl group such as phenethyl; hydroxyethyl; alkoxyethyl, such as ethoxyethyl; acyloxyethyl, such as acetyloxyethyl or propionyloxyethyl; cyanoethyl; alkoxycarbonylethyl, such as methoxycarbonylethyl; alkylsulfonylethyl, such as methylsulfonylethyl and nitroethyl.

The dyestuffs of the present invention are particularly suited for the dyeing and printing of fabrics made from synthetic hydrophobic materials such as linear polyesters, acetyl cellulose, polyamides and polycarbonates. By fabrics made from synthetic hydrophobic materials are understood, for instance, films and textile materials such as fibers, filaments and flocks, as well as woven and knitted fabrics.

Textile materials on the basis of polyesters, for instance, of polyethylene-glycolterephthalate or of those on the basis of terephthalic acid and p-dimethylolcyclohexane can be dyed by means of these dyes according to known processes. The dyeing temperatures for the dyestuffs in aqueous dispersion are, when applied at normal pressure, 95°–100°C., preferably about 100°C., or, when applied at increased pressure, 104°–140°C. Using temperatures of about 100°C., it is advisable to add carriers to the dye bath. As such carriers can be employed, for example, aromatic hydrocarbons such as diphenyl, aromatic halogen compounds, such as chlorobenzenes, aromatic carboxylic acids, such as benzoic acid and salicyclic acid, phenols, such as o- and p-phenylphenols and esters, such as terephthalic acid ester. Instead of the dyeing from the bath, the hot-air fixing of the dyestuffs can also be undertaken at temperatures of 200°–230°C. The printing can be carried out in such a manner that the materials after being printed are steamed in the presence of a carrier at temperatures between about 80°–110°C. or in the absence of a carrier at about 110°–140°C. or alternatively are treated according to the so-called thermofixing process at about 170°–230°C.

Typical preparations are described in the following examples where all temperatures are in degrees centrigrade.

EXAMPLE 1

23 g. 2-cyano-4-nitro-6-methylsulfonylaniline are introduced at 15°–20° into 157 g. nitrosylsulfuric acid (prepared from 150 g. sulfuric acid (66°Be) and 7 g. sodium nitrate) and stirred during 3 hours at 20°. 23.3 g. N-cyanoethylamino-2-methoxy-5-acetylaminoaniline are dissolved in the equivalent amount of dilute aqueous hydrochloric acid and admixed with 1 g. urea, 300 g. ice and the above diazo solution. Subsequently, the reaction mixture is diluted with iced water, stirred for a short while, sucked off and the residue is thoroughly rinsed with water. Obtained is, after drying, a dyestuff powder which dyes when applied in a finely dispersed form polyester fibers blue shades.

EXAMPLE 2

52.8 g. 2-bromo-4-nitro-6-methylsulfonyl-1-[4′-N-ethylamino-2′-propionylamino-5′-methoxy-phenylazo]-benzene and 10 g. copper(I)-cyanide are introduced into 150 c.c. dimethylsulfoxide and heated to 100°. After ½ hour's time the reaction mixture is allowed to cool down, sharply sucked off and the residue is washed with little dimethylsulfoxide and much water. Obtained are 37 g. 2-cyano-4-nitro-6-methylsulfonyl-1-[4′-N-ethylamino-2′-propionylamino-5′-methoxy-phenylazo]-benzene which, when applied in a finely dispersed form, dyes polyester fibers greenish blue shades.

EXAMPLE 3

47.5 g. 2-bromo-4-nitro-6-cyano-1-[4′-N-ethylamino-2′-acetylamino-5′-ethoxy-phenylazo]-benzene, 17 g. zinc methylsulfinate and 2 g. copper(I)oxide are successively introduced into 100 c.c. dimethylsulfoxide and heated to 70°. After 1 hour's time, the reaction mixture is cooled down, sharply sucked off and the residue is washed with little dimethylsulfoxide and much water. Obtained are 31 g. 2-methylsulfonyl-4-nitro-6-cyano-1-[4′-N-ethylamine-2′-acetylamino-5′-ethoxyphenylazo]-benzene, which, when applied in a finely dispersed form, dyes polyester fibers greenish blue shades.

EXAMPLE 4

52.8 g. 2-bromo-4-nitro-6-methylsulfonyl-1-[4′-N-ethylamino-2′-acetylamino-5′-ethoxy-phenylazo]-benzene and 10 g. copper(I)cyanide are introduced into 100 c.c. dimethylsulfoxide and heated to 100°. After ¼ hour's time the reaction mixture is cooled down, sharply sucked off and the residue is washed with little dimethylsulfoxide and much water. Obtained are 36 g. of a dyestuff which is identical with that described in Example 3.

EXAMPLE 5

50 g. 2-cyano-4,6-dinitro-1-[4′-N-carbmethoxyethylamino-2′-acetylamino-5′-ethoxy-phenylazo]-benzene, 15 g. sodium methyl sulfinate and 0.5 g. copper-I-bromide are successively introduced into 150 c.c. dimethylsulfoxide. The reaction mixture is then heated during 3 hours to 70°, cooled down after 1 hour, sharply sucked off and the residue is washed with little dimethylsulfoxide and much water. Obtained are 33 g. 2-methylsulfonyl-4-nitro-6-cyano-1-[4′-N-carbmethoxyethylamino-2′-acetylamino-5′-ethoxy-phenylazo]-benzene which, in a finely dispersed form, dyes polyester fibers greenish blue shades.

The following table illustrates further dyes of the present invention which dye polyester fibers given shades with comparably good properties.

General formula:

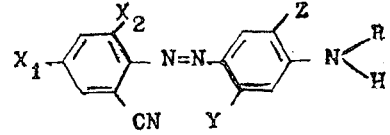

| Example | $X_1$ | $X_2$ | Y | Z | R | Shade |
|---|---|---|---|---|---|---|
| 6 | $NO_2$ | $SO_2CH_3$ or $SO_2C_2H_5$ | H | H | $CH_2CH_2CN$ | reddish violet |
| 7 | " | " | H | H | $CH_2CH_2OCOCH_3$ | " |
| 8 | " | " | H | H | $CH_2CH_2OH$ | violet |
| 9 | " | " | H | H | $CH_3$ | " |
| 10 | " | " | $CH_3$ | H | $CH_2CH_2CN$ | " |
| 11 | " | " | " | H | $CH_2CH_2COOCH_3$ | " |
| 12 | $NO_2$ | $SO_2CH_3$ or $SO_2C_2H_5$ | $C_2H_5$ | H | $C_4H_9$ | violet |
| 13 | " | " | " | H | $CH_2CH_2OCOC_2H_5$ | " |
| 14 | " | " | $OCH_3$ | H | $CH_2CH_2-C_6H_5$ | reddish violet |
| 15 | " | " | " | H | $C_2H_5$ | " |
| 16 | " | " | $OC_2H_5$ | H | $CH_2CH_2SO_2CH_3$ | " |
| 17 | " | " | " | H | $CH_2CH_2OH$ | " |
| 18 | " | " | $CH_3$ | $OCH_3$ | $CH_2CH_2COOCH_3$ | violet |
| 19 | " | " | $NHCOCH_3$ | H | $CH_3$ | reddish blue |

-continued

| Example | $X_1$ | $X_2$ | Y | Z | R | Shade |
|---|---|---|---|---|---|---|
| 20 | " | " | " | H | $C_4H_9$ | " |
| 21 | " | " | " | H | $CH_2CH_2OH$ | " |
| 22 | " | " | " | H | $CH_2CH_2OCOCH_3$ | bluish violet |
| 23 | " | " | " | H | $CH_2CH_2CN$ | " |
| 24 | " | " | " | H | $CH_2CH_2-C_6H_5$ | " |
| 25 | " | " | " | H | $CH_2CH_2SO_2C_2H_5$ | " |
| 26 | " | " | $NHCOC_2H_5$ | H | $CH_2CH_2COOCH_3$ | reddish blue |
| 27 | " | " | $NHCOC_3H_7$ | H | $CH_2CH_2NO_2$ | bluish violet |
| 28 | " | " | $NHCOOCH_3$ | H | $CH_2CH_2OCOOCH_3$ | " |
| 29 | " | " | $NHCONH_2$ | H | $C_2H_5$ | reddish blue |
| 30 | " | " | $NHCONHC_2H_5$ | H | $CH_2CH_2OCOCH_3$ | bluish violet |
| 31 | " | " | $NHCONHC_3H_5$ | H | $CH_3$ | reddish blue |
| 32 | " | " | $NHCOCH_2Cl$ | H | $C_2H_5$ | " |
| 33 | $NO_2$ | $SO_2CH_3$ or $SO_2C_2H_5$ | $NHCOCH_2OH$ | H | $C_2H_5$ | reddish blue |
| 34 | " | " | $NHCOCH_2OCH_3$ | H | " | " |
| 35 | " | " | $NHCOCH_2OCOCH_3$ | H | " | " |
| 36 | " | " | $NHCOCH_2CN$ | H | " | " |
| 37 | " | " | $NHCOCH_3$ | $CH_3$ | $C_4H_9$ | greenish blue |
| 38 | " | " | " | $C_2H_5$ | $CH_2CH_2OH$ | " |
| 39 | " | " | " | $OCH_3$ | $C_2H_5$ | " |
| 40 | " | " | " | " | $CH_2CH_2OCOCH_3$ | blue |
| 41 | " | " | " | $OC_2H_5$ | $CH_2CH_2OH$ | greenish blue |
| 42 | " | " | " | " | $CH_2CH_2OCOCH_3$ | blue |
| 43 | " | " | " | " | $CH_2CH_2COOCH_3$ | greenish blue |
| 44 | " | " | " | " | $CH_2CH_2CN$ | blue |
| 45 | " | " | " | " | $C_4H_9$ | greenish blue |
| 46 | " | " | $NHCOC_2H_5$ | " | $CH_3$ | " |
| 47 | " | " | $NHCOOCH_3$ | " | $C_2H_5$ | " |
| 48 | " | " | $NHCONHC_2H_5$ | " | " | " |
| 49 | " | " | $NHCOCH_3$ | $OC_2H_4OH$ | " | " |
| 50 | " | " | " | $OC_2H_4OOCH_3$ | " | " |
| 51 | " | " | " | $OC_2H_4Cl$ | " | " |
| 52 | " | " | " | $OC_2H_4CN$ | " | " |
| 53 | " | " | " | $OC_2H_5$ | $CH_2CH_2-C_6H_5$ | " |
| 54 | " | " | " | $OCH_3$ | $CH_2CH_2OCOC_2H_5$ | blue |
| 55 | " | " | " | " | $CH_2CH_2OCOCH_2OC_6H_5$ | " |
| 56 | $NO_2$ | $SO_2CH_3$ or $SO_2C_2H_5$ | $NHCOCH_3$ | $OC_2H_5$ | $CH_2CH_2OCONHC_2H_5$ | blue |
| 57 | " | " | " | " | $CH_2CH_2NO_2$ | greenish blue |
| 58 | " | " | " | " | $CH_2CH_2OC_2H_5$ | " |
| 59 | " | " | " | " | $CH_2CH_2OC_6H_5$ | " |
| 60 | " | " | " | " | $CH_2CH_2N(CH_3)COCH_3$ | " |
| 61 | " | " | $NHCOC_2H_5$ | " | $C_2H_5$ | " |
| 62 | " | " | $NHCOC_6H_5$ | " | " | " |
| 63 | " | " | $NHCOOC_2H_5$ | $OCH_3$ | " | " |
| 64 | " | " | $NHCONH_2$ | " | " | " |
| 65 | CN | " | H | H | $CH_2CH_2CN$ | purplish red |
| 66 | " | " | H | H | $CH_2CH_2OCOCH_3$ | " |
| 67 | " | " | H | H | $CH_2CH_2OH$ | reddish violet |
| 68 | " | " | H | H | $CH_3$ | " |
| 69 | " | " | $CH_3$ | H | $CH_2CH_2CN$ | " |
| 70 | " | " | " | H | $CH_2CH_2COOCH_3$ | " |
| 71 | " | " | $C_2H_5$ | H | $C_4H_9$ | " |
| 72 | " | " | " | H | $CH_2CH_2OCOC_2H_5$ | " |
| 73 | " | " | $OCH_3$ | H | $CH_2CH_2-C_6H_5$ | purplish red |
| 74 | " | " | " | H | $C_2H_5$ | " |
| 75 | " | " | $OC_2H_5$ | H | $CH_2CH_2SO_2CH_3$ | " |
| 76 | " | " | " | H | $CH_2CH_2OH$ | " |
| 77 | " | " | $CH_3$ | $OCH_3$ | $CH_2CH_2COOCH_3$ | reddish violet |
| 78 | " | " | $NHCOCH_3$ | H | $CH_3$ | bluish violet |
| 79 | CN | $SO_2CH_3$ or $SO_2C_2H_5$ | $NHCOCH_3$ | H | $C_4H_9$ | bluish violet |
| 80 | " | " | " | H | $C_2H_5$ | " |
| 81 | " | " | " | H | $CH_2CH_2OH$ | " |
| 82 | " | " | " | H | $CH_2CH_2OCOCH_3$ | violet |
| 83 | " | " | " | H | $CH_2CH_2CN$ | " |
| 84 | " | " | " | H | $CH_2CH_2-C_6H_5$ | " |
| 85 | " | " | " | H | $CH_2CH_2SO_2C_2H_5$ | " |
| 86 | " | " | $NHCOC_2H_5$ | H | $CH_2CH_2COOCH_3$ | " |
| 87 | " | " | $NHCOC_3H_7$ | H | $CH_2CH_2NO_2$ | " |
| 88 | " | " | $NHCOOCH_3$ | H | $CH_2CH_2OCOOCH_3$ | " |

-continued

| Example | X₁ | X₂ | Y | Z | R | Shade |
|---|---|---|---|---|---|---|
| 89 | '' | '' | NHCONH₂ | H | C₂H₅ | bluish violet |
| 90 | '' | '' | NHCONHC₂H₅ | CH₂CH₂OCOCH₃ | | violet |
| 91 | '' | '' | NHCONHC₃H₅ | H | CH₃ | bluish violet |
| 92 | '' | '' | NHCOCH₂Cl | H | C₂H₅ | '' |
| 93 | '' | '' | NHCOCH₂OH | H | '' | '' |
| 94 | '' | '' | NHCOCH₂OCH₃ | H | '' | '' |
| 95 | '' | '' | NHCOCH₂OCOCH₃ | H | '' | '' |
| 96 | '' | '' | NHCOCH₂CH | H | '' | '' |
| 97 | '' | '' | NHCOCH₃ | CH₃ | C₄H₉ | blue |
| 98 | '' | '' | '' | C₂H₅ | CH₂CH₂OH | '' |
| 99 | '' | '' | '' | OCH₃ | C₂H₅ | '' |
| 100 | '' | '' | '' | '' | CH₂CH₂CN | '' |
| 101 | CN | SO₂CH₃ or SO₂C₂H₅ | NHCOCH₃ | OCH₃ | CH₂CH₂OCOCH₃ | blue |
| 102 | '' | '' | '' | OC₂H₅ | CH₂CH₂OH | '' |
| 103 | '' | '' | '' | '' | CH₂CH₂OCOCH₃ | '' |
| 104 | '' | '' | '' | '' | CH₂CH₂COOCH₃ | '' |
| 105 | '' | '' | '' | '' | CH₂CH₂CN | '' |
| 106 | '' | '' | '' | '' | C₄H₉ | '' |
| 107 | '' | '' | NHCOC₂H₅ | '' | CH₃ | '' |
| 108 | '' | '' | NHCOOCH₃ | '' | C₂H₅ | '' |
| 109 | '' | '' | NHCONHC₂H₅ | '' | '' | '' |
| 110 | '' | '' | NHCOCH₃ | OC₂H₄OH | '' | '' |
| 111 | '' | '' | '' | OC₂H₄OCOCH₃ | '' | '' |
| 112 | '' | '' | '' | OC₂H₄Cl | '' | '' |
| 113 | '' | '' | '' | OC₂H₄CN | '' | '' |
| 114 | SO₂CH₃ or SO₂C₂H₅ | '' | H | H | CH₂CH₂CN | red |
| 115 | '' | '' | H | H | CH₂CH₂OCOCH₃ | '' |
| 116 | '' | '' | H | H | CH₂CH₂OH | purplish red |
| 117 | '' | '' | H | H | CH₃ | '' |
| 118 | '' | '' | CH₃ | H | CH₂CH₂CN | '' |
| 119 | '' | '' | '' | H | CH₂CH₂COOCH₃ | '' |
| 120 | '' | '' | C₂H₅ | H | C₄H₉ | '' |
| 121 | '' | '' | '' | H | CH₂CH₂OCOC₂H₅ | '' |
| 122 | SO₂CH₃ or SO₂C₂H₅ | SO₂CH₃ or SO₂C₂H₅ | OCH₃ | H | CH₂CH₂-C₆H₅ | purplish red |
| 123 | '' | '' | '' | H | C₂H₅ | '' |
| 124 | '' | '' | OC₂H₅ | H | CH₂CH₂SO₂CH₃ | '' |
| 125 | '' | '' | '' | H | CH₂CH₂OH | '' |
| 126 | '' | '' | CH₃ | OCH₃ | CH₂CH₂COOCH₃ | reddish violet |
| 127 | '' | '' | NHCOCH₃ | H | CH₃ | bluish violet |
| 128 | '' | '' | '' | H | C₄H₉ | '' |
| 129 | '' | '' | '' | H | C₂H₅ | '' |
| 130 | '' | '' | '' | H | CH₂CH₂OH | '' |
| 131 | '' | '' | '' | H | CH₂CH₂OCOCH₃ | reddish violet |
| 132 | '' | '' | '' | H | CH₂CH₂CN | '' |
| 133 | '' | '' | '' | H | CH₂CH₂-C₆H₅ | '' |
| 134 | '' | '' | '' | H | CH₂CH₂SO₂C₂H₅ | '' |
| 135 | '' | '' | NHCOC₂H₅ | H | CH₂CH₂COOCH₃ | '' |
| 136 | '' | '' | NHCOC₃H₇ | H | CH₂CH₂NO₂ | '' |
| 137 | '' | '' | NHCOOCH₃ | H | CH₂CH₂OCOOCH₃ | '' |
| 138 | '' | '' | NHCONH₂ | H | C₂H₅ | violet |
| 139 | '' | '' | NHCONHC₂H₅ | H | CH₂CH₂OCOCH₃ | reddish violet |
| 140 | '' | '' | NHCONHC₃H₅ | H | CH₃ | violet |
| 141 | '' | '' | NHCOCH₂Cl | H | C₂H₅ | '' |
| 142 | '' | '' | NHCOCH₂OH | H | '' | '' |
| 143 | '' | '' | NHCOCH₂OCH₃ | H | '' | '' |
| 144 | SO₂CH₃ or SO₂C₂H₅ | SO₂CH₃ or SO₂C₂H₅ | NHCOCH₂OCOCH₃ | H | C₂H₅ | violet |
| 145 | '' | '' | NHCOCH₂CN | H | '' | '' |
| 146 | '' | '' | NHCOCH₃ | CH₃ | C₄H₉ | blue |
| 147 | '' | '' | '' | C₂H₅ | CH₂CH₂OH | '' |
| 148 | '' | '' | '' | OCH₃ | C₂H₅ | '' |
| 149 | '' | '' | '' | '' | CH₂CH₂CN | '' |
| 150 | '' | '' | '' | '' | CH₂CH₂OCOCH₃ | '' |
| 151 | '' | '' | '' | OC₂H₅ | CH₂CH₂OH | '' |
| 152 | '' | '' | '' | '' | CH₂CH₂OCOCH₃ | '' |
| 153 | '' | '' | '' | '' | CH₂CH₂COOCH₃ | '' |
| 154 | '' | '' | '' | '' | CH₂CH₂CN | '' |
| 155 | '' | '' | '' | '' | C₄H₉ | '' |
| 156 | '' | '' | NHCOC₂H₅ | '' | CH₃ | '' |
| 157 | '' | '' | NHCOOCH₃ | '' | C₂H₅ | '' |
| 158 | '' | '' | NHCONHC₂H₅ | '' | '' | '' |
| 159 | '' | '' | NHCOCH₃ | OC₂H₄OH | '' | '' |
| 160 | '' | '' | '' | OC₂H₄OCOCH₃ | '' | '' |
| 161 | '' | '' | '' | OC₂H₄Cl | '' | '' |
| 162 | '' | '' | '' | OC₂H₄CN | '' | '' |
| 163 | '' | '' | NHCOC₂H₅ | OC₂H₅ | '' | greenish blue |

Those dyes containing instead of the methyl or ethylsulfonyl group a sulfonyl group which is substituted by hydroxymethyl, hydroxyethyl, cyanoethyl or cyanomethyl hardly differ in the shade from the corresponding above-described dyes; partly, however, they show a better fastness to sublimation.

EXAMPLE 164

25 g. of a polyethylene-glycolterephthalate yarn are introduced at 50°–60° into a dyebath which has a pH-value adjusted to 5–6 by acetic acid and contains per liter of water 5–10 g. of a carrier, such as o-phenylphenol, and 0,5 g. of the dyestuff in a finely dispersed form, as is described in Example 3. The dyebath is then heated to boiling within 30 minutes and kept at this temperature for 90 minutes. The material so dyed is after-treated by reduction at 60°–70° for 20–30 minutes with 4 c.c./l. sodium hydroxide solution (38° Be) and 2 g./l. dithionite. Then the yarn is rinsed in warm water, acidified with acetic acid and again rinsed in water. One thus obtains a clear greenish blue dyeing with excellent fastness properties.

EXAMPLE 165

A fabric made from polyethylene-glycolterephthalate is padded at 40° with a padding liquor containing per liter of water 2–3 g. of an ethylene oxide adduct as dispersing agent, 20 g. of a thickener on the basis of polyacrylic acid, and 2 g. of the finely dispersed dyestuff described in Example 3. Subsequently, the fabric is dried and, by passing it through a curing range for 60 seconds at 200°–230°, the dyeing is fixed. The material is after-treated by reduction at 60°–70° for 20 minutes with 4 c.c./l. sodium hydroxide solution (38° Be) and 2 g./l. dithionite. Then it is rinsed in water, acidifed with acetic acid, and rinsed again. A clear greenish blue dyeing with excellent fastness properties is obtained.

EXAMPLE 166

A fabric made from polyester is printed on a roller printing machine with a printing paste composed of 50 g. of a 10% dye paste containing the dye of Example 5 in a finely dispersed form, 250 g. of a starch tragacanth thickening, 250 g. of a crystallized rubber thickening (1:3), and 450 g. water or thickening. After printing and drying, the print is either fixed by passing the fabric through a curing range at 190°–210° for 30–60 seconds or by steaming for 10–20 minutes with an excess pressure of 1–2 atmospheres. Both methods yield greenish blue prints with excellent fastness properties.

We claim:

1. A process which comprises dyeing or printing a hydrophobic synthetic material selected from the group consisting of linear polyesters, acetyl cellulose, polyamides and polycarbonates with a dyestuff of the formula

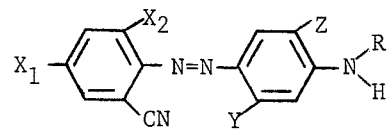

wherein $X_1$ is nitro, cyano or alkylsulfonyl having from 1 to 4 carbon atoms; $X_2$ is alkylsulfonyl having 1 to 4 carbon atoms; Y is alkanoylamino having 2 to 5 carbon atoms; Z is hydrogen or alkoxy having 1 to 4 carbon atoms and R is alkyl having 1 to 4 carbon atoms or mono-substituted alkyl wherein said alkyl moiety has from 1 to 4 carbon atoms and said substituent is cyano, acetoxy, hydroxy, methoxycarbonyl, ethoxycarbonyl, phenyl, methylsulfonyl, ethylsulfonyl or nitro.

2. The process of claim 1 wherein $X_1$ is nitro, $X_2$ is methylsulfonyl, Y is acetylamino and R is ethyl.

3. The process of claim 1 wherein $X_1$ is cyano, $X_2$ is methylsulfonyl, Y is acetylamino, R is ethyl and Z is ethoxy.

4. The process of claim 1 wherein $X_1$ is nitro, $X_2$ is methylsulfonyl, Y is acetylamino, R is ethyl and Z is acetoxy.

* * * * *